Dec. 29, 1970  O. MUSGRAVE  3,550,364
RIDING MOWER

Filed Sept. 25, 1967  6 Sheets-Sheet 1

INVENTOR
ORLY MUSGRAVE
BY Jerome P. Bloom
ATTORNEY

FIG-3

INVENTOR
ORLY MUSGRAVE
BY *Jerome P. Bloom*

ATTORNEY

Dec. 29, 1970  O. MUSGRAVE  3,550,364
RIDING MOWER

Filed Sept. 25, 1967  6 Sheets-Sheet 5

INVENTOR
ORLY MUSGRAVE

BY

ATTORNEY

United States Patent Office 3,550,364
Patented Dec. 29, 1970

1

3,550,364
RIDING MOWER
Orly Musgrave, Springfield, Ohio, assignor to Mast-Foos Manufacturing Company, Incorporated, Springfield, Ohio, a corporation of Ohio
Filed Sept. 25, 1967, Ser. No. 670,151
Int. Cl. A01d 35/26
U.S. Cl. 56—25.4                                   15 Claims

ABSTRACT OF THE DISCLOSURE

A tractor type work vehicle having a novel independent front suspension, unique support elements which stabilize its chassis, a simple disposition of controls and means for a stabilized mount thereto of working elements such as mower blades to enable the adjustment thereof in correspondence with said front suspension; preferred embodiments providing rugged, durable and highly versatile riding mowers and like vehicles.

This invention relates to improvements in work vehicles. It will be particularly illustrated in reference to a riding mower but its application is obviously not so limited. Moreover, such is not intended.

Riding mowers have been previously developed in various shape and form. In efforts to bring their price within the reach of the average home owner, their manufacturers have come up with designs which make them difficult to operate with any high degree of efficiency. Their frames or chassis, their suspension systems and the manner of applying thereto the mower deck and blade structures has in practically all cases produced a relatively rigid and inflexible unit. Further, they have been so built the rider is subjected to considerable vibration and discomfort. Moreover, their performance in movements over irregularly contoured terrain has left much to be desired. This last problem not only involves poor cutting efficiency but produces undue load on the mower suspension, blade units and over-all frame structure of the chassis. Thus, conventional riding mowers have been afflicted with poor performance capabilities and limited satisfactory operating life.

The present invention, as will be seen, provides a mobile work vehicle such as a riding mower the frame of which is simple and economical to fabricate and reinforced by unique rod means lending optimal strength while accommodating stresses and strains which normally occur in movement of the vehicle over a ground surface. In the embodiment of the invention illustrated the front wheels of the vehicle are each provided with unique hinged suspension devices affording a yielding accommodation of the wheels to movements over different ground levels. Moreover, the suspension system so provided isolates the mower frame, platform or chassis, as the case may be, from undue lateral stress and strain. The invention further features a unique support structure for the attached working elements, such as mower blades, so the assembly thereof may adjust independently of the mower chassis or frame and be so related to inhibit reflected vibration and stress.

A primary object of the invention is to provide improvements in mobile work vehicles rendering them economical to fabricate, more efficient and satisfactory in use, adaptable to a wide variety of applications and unlikely to malfunction. A further object of the invention is to provide new concepts in riding mowers and like structures.

Another object of the invention is to provide new and improved suspension devices for the wheels of riding mowers and other tractor or work-type vehicles.

2

A further object of the invention is to provide novel torsion bars in application to a simple frame whereby to effect an economically strengthened chassis for a work vehicle such as a riding mower which is capable of absorbing and accommodating a significant amount of shock, stress and strain.

An additional object of the invention is to provide a chassis for a work vehicle such as a riding mower which enables simplified placement of its various control structures.

Another object of the invention is to provide a new suspension system for mower blades and the like as applied to tractor or other work type vehicles.

A further object of the invention is to provide in a riding mower or like work vehicle means for connection therewith of cutting elements such as mower blades and their deck structure so as to enable their relative adjustment to peculiarities of a ground surface independently of the vehicle frame or chassis.

Another object of the invention is to provide a work type vehicle and components thereof possessing the advantageous structural features, the inherent meritorious characteristics and the means and mode of operation herein described.

An additional object of the invention is to provide an improved blade and deck structure and suspension means for said structure possessing the advantageous structural features, the inherent meritorious characteristics, and the means and mode operation herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention.

FIG. 8 is a front elevation, partly in section, of the front wheels and suspension structure for the illustrated vehicle while

Like parts are indicated by similar characters of reference throughout the several views.

The invention embodiment shown provides a uniquely fabricated, comfortable and most durable and efficient riding mower.

The mower chassis here illustrated includes a plate providing a rectangular elongate platform 10 having vertically dependent flanges 11 at its sides. At its forward and rear extremities the flanges 11 are bridged by guard plates 12 and 13.

Figure 2:
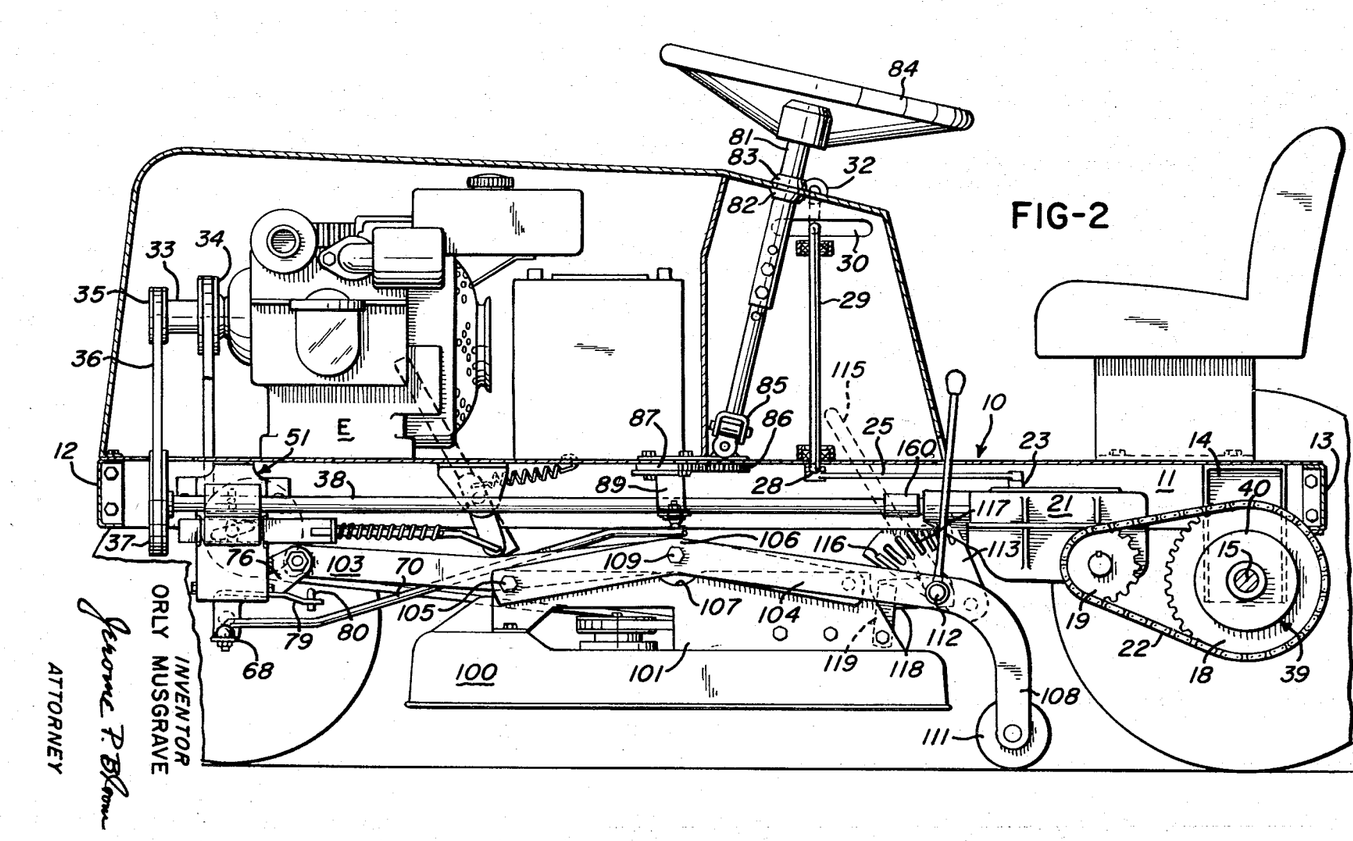
FIG. 2 is a view in side elevation with parts removed to highlight inventive detail.

Transversely aligned brackets 14 are fixed to equally depend from the flanges 11 adjacent and spaced forwardly of the rear guard plate 13. The brackets 14 have transversely aligned apertures to accommodate the projection therethrough and to provide bearings for a rear axle assembly 15. Outwardly of the brackets 14 the shaft extremities of the axle assembly 15 fixedly mount wheels 16. It is noted that the axle assembly includes two shaft segments (not shown) interconnected by a differential unit the rotatable housing of which is identified by 17. The differential unit may be such as disclosed in applicant's copending application Ser. No. 438,888 filed Mar. 11, 1965. Since the details of the differential unit and the axle assembly are otherwise not perse essential to an understanding of the present invention, they are not further described. Assembled to the axle assembly, in a fixed relation to one side of the housing 17, is a large sprocket 18. The latter is driven by a small sprocket 19 on the output shaft 20 of a transmission unit 21 through the medium of a continuous sprocket chain 22. As will be noted from FIG. 2 of the drawings, the sprocket 19 is spaced immediately forward of and in co-planar relation to the sprocket 18.

Figures 1, 4:
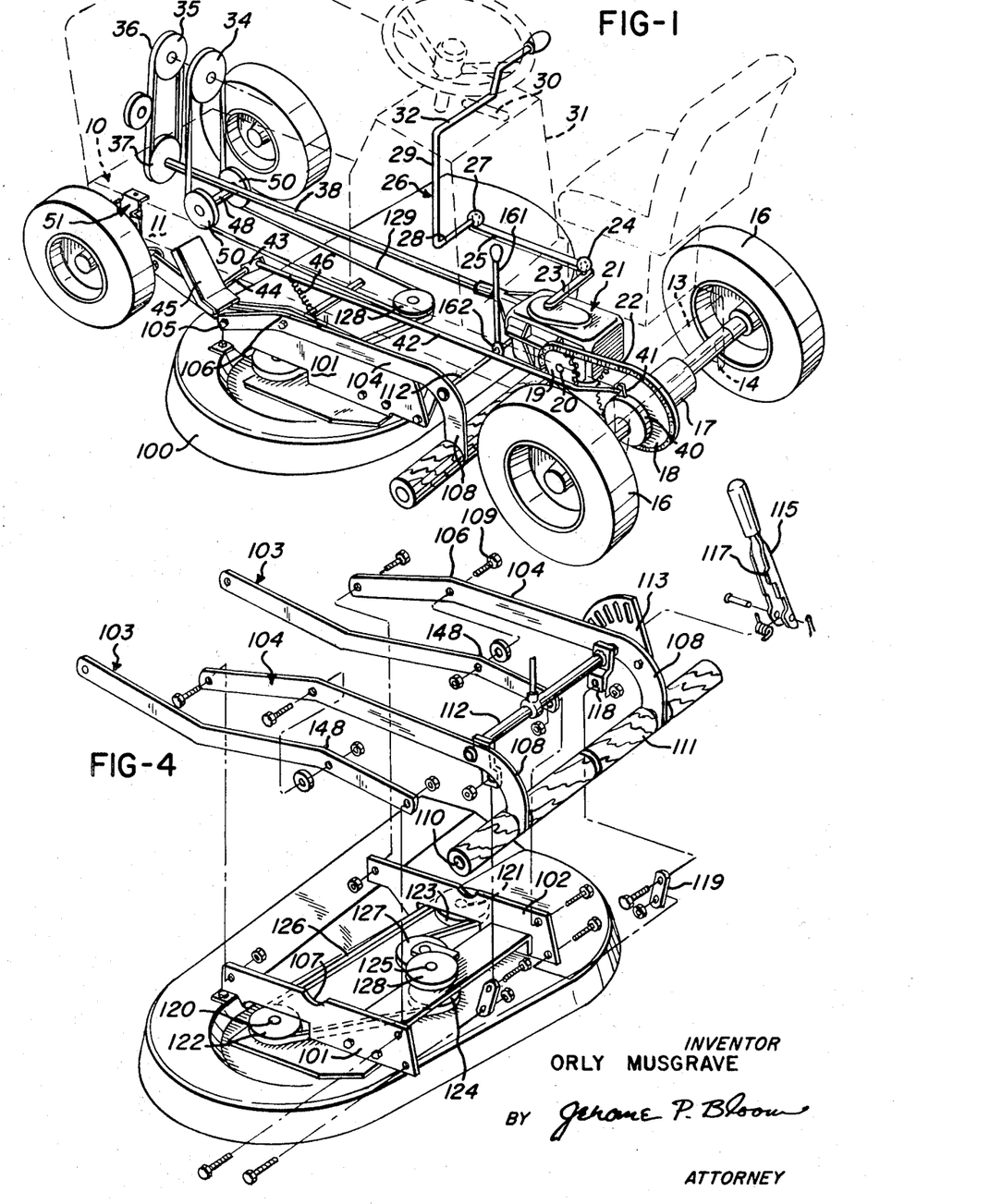
FIG. 1 is a fragmentary perspective view of a riding mower embodying the various features of the present invention, with parts removed for clarity of disclosure.
FIG. 4 is an exploded view, in perspective, of the blade housing, controls and their suspension means as provided in the invention embodiment illustrated.

The transmission unit 21 is essentially of a character of that described in my co-pending application Ser. No. 670,059 filed Sept. 25, 1967, now U.S. Pat. 3,457,798. It therefore embodies a cam control for a change speed mechanism as there described adjusted in this instance through the medium of a horizontally pivoted lever arm 23. As schematically shown in FIG. 1 of the drawings, the latter is connected by a ball pivot joint 24 at its outer end to a forwardly directed link element 25. The link 25 runs below and is directed in a sense forwardly of the platform 10, immediately adjacent its right hand flange 11. Its forward extremity is connected through the medium of a second ball pivot joint 27 to one extremity of a U-shaped arm 26. The arm 26 disposes on its side, the projected arm section 28 thereof which interconnects with the link 25 positioning under the platform 10, its bridging portion 29 projecting vertically upward through an aperture in the platform, and its other projected arm portion 32 existing through a slot 30 in the top of a shell-like housing 31. The latter is superposed on the platform 10 to serve as an enclosure medium. The extremity of arm portion 32 is offset upwardly as it projects through slot 30 to extend to the right side of the platform where it provides an accessible operator for the arm 26. As may be seen, a simple, straight, small increment of movement of the operator creates a direct and corresponding movement of the control lever 23 within a single, well defined, controlled path. By this means, dependent on the ultimate position of the operator, one may relatively place the elements of the transmission unit 21 in position for neutral, first, second, or third forward speeds, or reverse, as needs require.

It will be seen that the arm 26 has a fixed vertical orientation. Therefore, as determined by the movement of its operator, its own movements produce straight line positions of link 25, increments of forward or rearward adjustment thereof being directly related to and indicative of the positioning of the elements of the transmission unit 21 through the medium of lever 23.

At the forward end thereof, the platform 10 mounts an engine E the drive shaft 33 of which projects forwardly to mount two mediums for power takeoff. The first is the pulley 34, used for furnishing power to ancillary working equipment as will be further described. The second is a smaller pulley 35 connected, as shown in FIG. 1, by a drive belt 36 to a pulley 37. The latter is fixed on the forward end of a power transmission shaft 38 which extends below and in a sense longitudinally of the platform 10. At its rear extremity the shaft 38 projects inwardly of the forward end of the housing for the transmission unit 21 in bearing relation thereto. Power is thus provided at the transmission unit, which power may be selectively coupled to the change speed gearing and thereby transmitted, as desired, to drive the rear differentially connected wheels 16.

The arrangement for supplying power to the rear wheels is thus simply effected and the nature of the drive mechanism is such that it may be simply controlled and simply disconnected in a manner to be further described.

The axle assembly 15 incorporates a brake assembly 39. In this respect, the sprocket 18 has fixed to the face thereof remote from the differential 17 a cylindrical housing 40. Nesting in the housing 40 are brake shoes (not shown) conventionally interconnected by springs and biased from the inner wall of the housing. The brake shoes, when applied, are spread by a cam (not shown) to exert a frictional clamp against the inner wall of the housing 40, against the influence of the interconnecting springs. Integrated with said cam is a lever 41 which projects radially outward of the brake housing where it pivotally connects to a forwardly extending link 42. The latter is pivotally connected at its forward end to the outer end of a radial arm 43 fixed on the innermost end of a laterally directed pivot shaft 44. As shown, shaft 44 projects through and bears in the flange 11 at the left side of platform 10 and its outer end has fixed thereon a brake operating pedal 45. Spring means 46 form a connection between the platform 10 and the link 42 to apply a bias to the link which normally urges the brake pedal, and correspondingly the brakes, to a normally inoperative position.

Fixed at the underside of the platform 10, just short of the forward guard plate 12 and centered between the flanges 11, is a U-shaped frame 47 the legs of which depend. Pivotally connected in suspended relation to the legs of the frame 47 by means of its own leg portions and suitable pivot means 47' is a second generally U-shaped bracket 49. The legs of the latter are bridged by shaft means 48 which rotatably mount pulley elements 50 at positions forwardly of and outwardly to either side of bracket 49 and the legs of frame 47. The function of pulleys 50 will be further described.

The invention embodiment illustrated features an independent front suspension system. Spaced outwardly from either side of the frame 47 and bolted to depend from each flange 11 of the platform 10 at its inner face is a bracket plate 51. The plates 51 are in direct transverse alignment.

Each plate 51, in horizontal section, has a U shape. Its arms 53 are directed perpendicular to the inner surface of the adjacent flange 11 and its bridging portion 52 is established in adjacent but spaced parallel relation to the inner face of such flange. The top of the plate has formed integral therewith a projected flange 52' which is bolted to the underside of the platform 10. At their upper ends the arms 53 include laterally directed and oppositely projected co-planar tabs 54 which are bolted in abutting relation to the adjacent flange. Beneath the tabs, the arms 53 are relatively projected to underlie and have the tops thereof abut the related flange. In this manner each plate 51 is firmly integrated with and releasably connected to the platform.

The portions of the arms 53 which dispose below the flanges 11 have vertically spaced apertures 55 and 56, providing transversely aligned apertures. Each of the vertically spaced pairs of apertures accommodate a pivot pin 57 which pivotally mounts thereto a flanged plate 58. The flanges on the plate 58 mutually depend and have to one end thereof apertures for alignment with the apertures 55 or 56, as the case may be, to receive therethrough the pins 57.

Thus, to either side of the front end of the platform 10 the lower portions of the arms 53 of the plate 51 mount vertically spaced plates 58 which are hinged thereto at their inner ends.

At either side of the platform the outer laterally projected ends of the plates 58 connect to a wheel mounting bracket 59. The bracket 59 has the general form of a right triangle and each of the extremities of its vertical edge has formed integral therewith, at right angles thereto, a bearing tube. The upper tube is identified as 61 and the lower as 62. The tube 61 disposes between the dependent flanges on the upper plate 58 to align with apertures in their outer ends. Once alignment is achieved, a pivot bolt 63 is threaded through the tube and the aligned apertures to afford a hinged connection of the upper plate 58 to the upper end of the bracket 59. The tube 62 disposes between the dependent flanges at the outer end of the lower plate 58 and is connected thereto in a similar manner. Integrated with the hypotenuse portion of the bracket 59, the length thereof, is a further tube 64. The tube 64 accommodates the pivot shaft portion 65 of a short axle for a front wheel 66. It is noted that the shaft portion 65 is suitably contained for rotation in the tube 64 while its lower end has formed integral therewith a horizontally and outwardly directed extension 67 on which is rotatably contained a wheel 66. In the example illustrated the shaft portion 65 is so inclined to form a 15 to 20 degree angle with a vertical, a 17-degree angle being preferred.

Radially projected from and fixed for movement with the shaft portion 65 is an offset arm 68 having fixed thereon a ball pivot element 69. As will be further seen, this serves for the coupling thereto of a steering rod 70.

Figure 8:
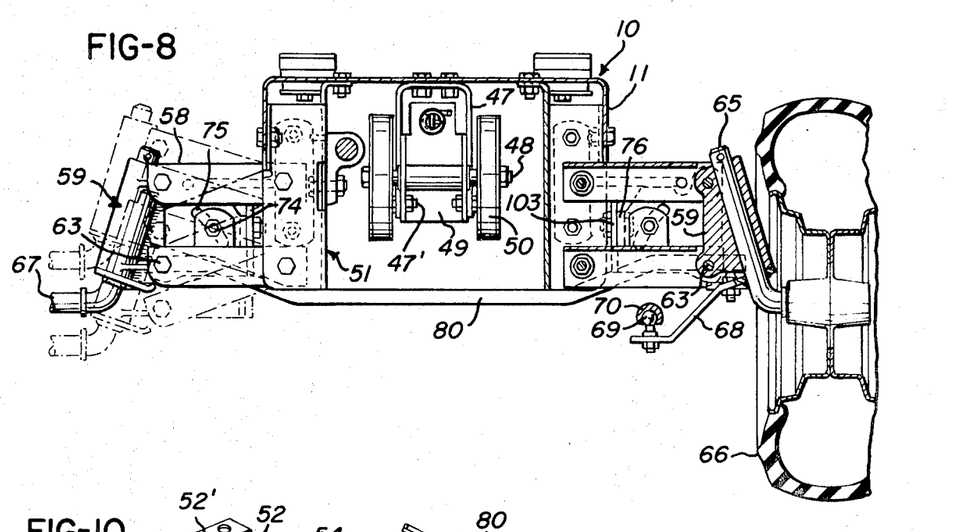

Considering the front and rear portions of the mower unit as illustrated, fixed at the rearmost dependent flanges of each pair of plates 58 to either side of the platform 10 is a plate-type bracket 73. In each instance the outermost edge of the plate 73 has vertically spaced apertures through which extend the pivot bolts 63 applied to connect the bracket 59 to the plates 58. The plate 73 is thus contained to move with and accommodate the relative movement of the related outer ends of the hinged plates. The lowermost of the related plates 58 has an upstanding tab adjacent the plate 73 from which projects a pin 74. The plate 73 is formed with an arcuate slot 75 to accommodate the projection therethrough of the pin 74. As may be seen with reference to FIGS. 8 through 10 of the drawings, the pin 74 serves as a limit device.

Formed integral with each plate 73, at its innermost edge most adjacent the platform 10, is a rearwardly directed right angled tab 76 including an aperture 77 the purpose of which will be further described.

Figures 9, 10:
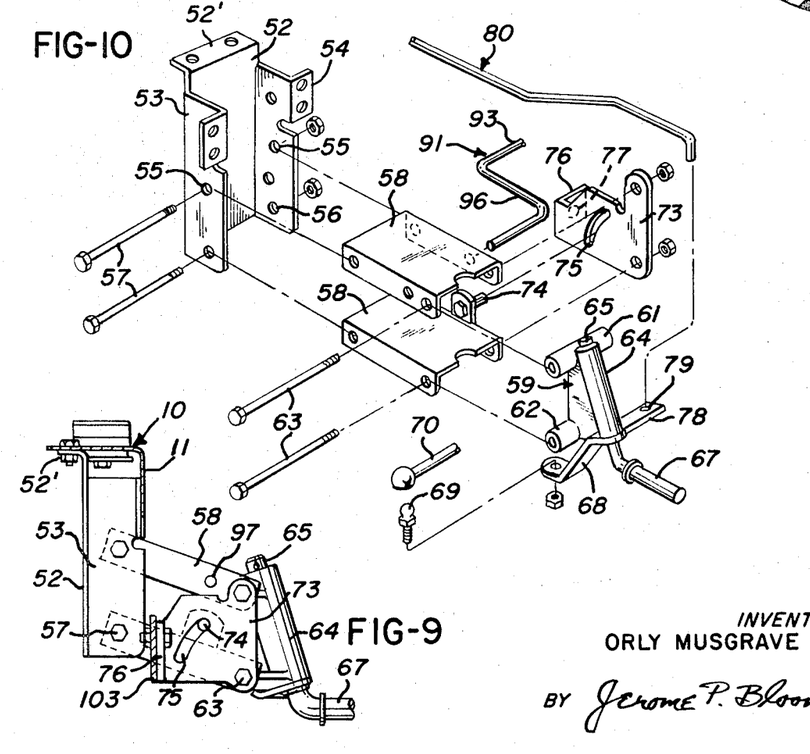
FIG. 9 is a fragmentary view illustrating further details thereof.
FIG. 10 is an exploded view of the suspension structure to which each front wheel mounts.
Figures 11, 12, 13:
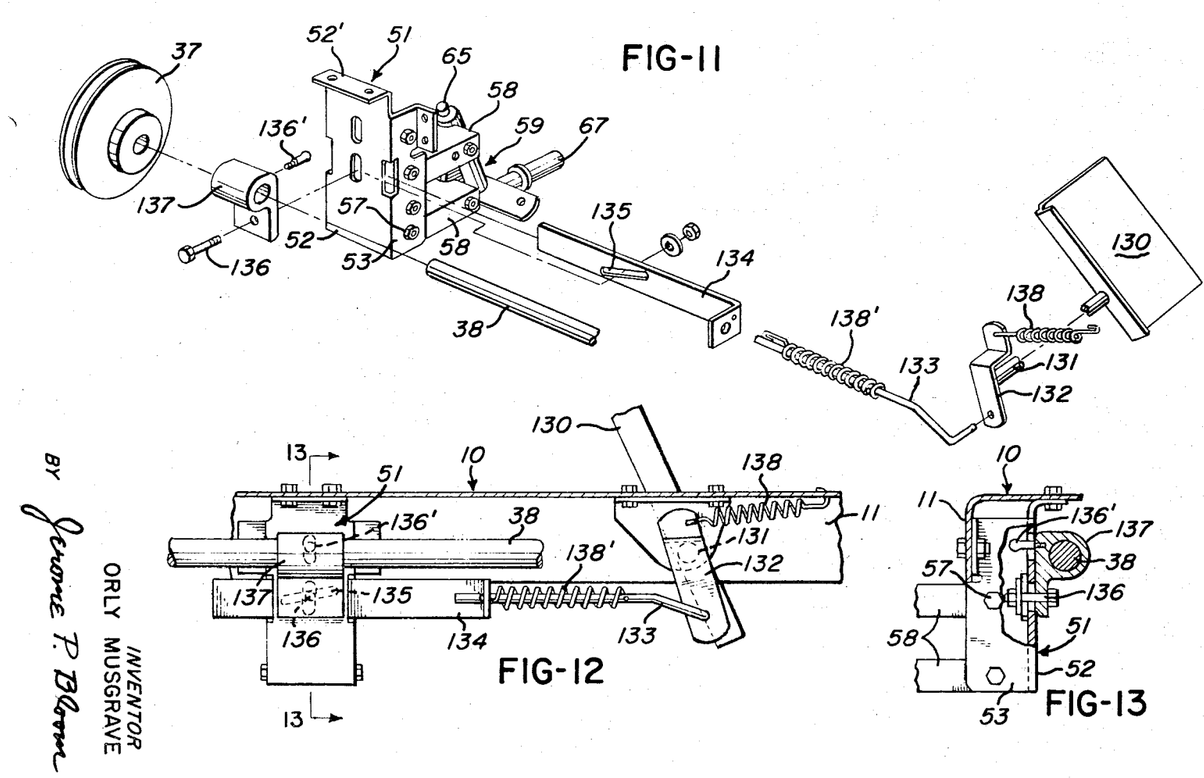
FIGS. 11–13 are exploded and fragmentary views of the means for enabling and disabling the transmission of power to operate the vehicle here illustrated.

Referring to FIG. 10 of the drawings, it may be there seen that the arm 68 has interconnected therewith a rearwardly extended lever portion 78 including an aperture 79. It is to be noted that the lever portions 78 thus provided to either side of the platform 10 relatively converge and are bridged by an interconnected bar 80 the extremities of which are bent to depend through the respective apertures 79. In this manner one provides a simple interconnection of the pivot shaft portions 65 for conjoint movement under the influence of the steering rod 70 which is in this case interconnected to the ball pivot 69 on the lever 68 at the left side of the platform 10.

By the structure above described there is provided, in any event, a unique inventive front suspension for a work vehicle, one which simply accommodates relative vertical adjustment of the front wheels 66 in correspondence with the needs dictated by the contour of the underlying terrain. As is well evidenced in the foregoing description as well as in the drawings, in a preferred embodiment there is a double pivot connection of each wheel 66 to a unique hinged plate structure enabling the wheels to adjust simply and relatively freely in a vertical sense, within the limits permitted by the pin 74 in slot 75. Though simple the structure is rugged and adaptable to provide ease and comfort as well as simplicity of maintenance.

It is noted that the flanges 11 may be suitably notched in the edge portions thereof in the path of the upper hinge plate 58 to accommodate its prescribed upper limit of travel.

The steering of the front wheels 66 originates centrally of the platform 10 in the shell-type housing 31. Projected upwardly and inclined rearwardly of the platform is a steering column 81. This assembly is projected through the top of the shell at which point it includes a bearing having the form of a segment of a sphere. The shell mounts complementary shell segments 82 and 83 providing a housing and bearing surfaces for the segment on the steering column. The upper end of the column 81 mounts a steering wheel 84 and its lower end has fixed thereto a bifurcated bracket 85. Universally coupled to the latter is a bracket mounting a gear 86, in mesh with a pie shaped gear segment 87 pivoted to the underside of and parallel to the platform 10. The lateral extremities of the segment 87 has vertically projected studs 88 which respectively project through an arcuate slot 88' in the platform 10. These slots define the limits of movement of the studs 88 and thereby of the gear segment 87.

Secured along one edge of the segment 87 is a radially elongated and relatively projected lever arm 89. A link bar 70 having a pivot connection at one end to the outer end of the arm 89 extends forwardly adjacent the left-hand side of the platform 10 and has its other end pivotally interconnected with the ball pivot 69 on the arm 68.

Accordingly, a simple turning of the steering wheel 84 produces a direct and corresponding adjustment of the gear segment 87, transmitted in turn to the bar 70 which serves as a steering rod to direct the angle of the left front wheel 66. The right front wheel turns correspondingly and simultaneously in view of the interconnection thereof through the medium of the bar 80.

The invention embodiment illustrated further features a pair of simple but highly effective torsion bars 91, one adjacent and disposed along either edge of the platform 10. Spaced to either side of the steering column and immediately to the rear thereof, the platform has an aperture accommodating the vertical projection therethrough of the upwardly bent extremity 92 of an elongate torsion bar 91. From this point each torsion bar has a longitudinally extended forwardly directed horizontal run 93 spaced immediately within the adjacent flange 11. The portion 93 is in each case in line with a rear arm portion 53 of a forward bracket 51 which fixedly mounts a strap providing a saddle-shaped torsion bar support 94. The latter has a notch 95 in its outermost edge through which passes the forward end of the torsion bar section 93. Beyond this point, the bar 91 has a right-angled outwardly directed portion 96 the extremity of which positions in the normal level of the adjacent upper hinge plate 58 and parallel to its most adjacent dependent side flange. The forward most extremity of bar 91 is then turned at right angles to project through aligned apertures 97 in the dependent flange portions of this upper plate 58, adjacent but spaced inwardly of their outer ends.

Accordingly, the longitudinally extended torsion bars with their particularly bent extremities provide a firm but yielding connection between the platform 10, at either side thereof, and the generally aligned hinge assemblies providing an independent suspension of the front wheels. In this manner the basic plate-like platform 10 is simply interrelated with the independent front suspension system so as to maintain a desired relation of the platform to the front wheels in any instance irrespective of their joint or relative movement. The interconnection of the torsion bars is such to readily accommodate stress and strain with minimal incidence of fatigue. The very construction of the bars, moreover, is such to simply accommodate relative movement of the parts in a somewhat resilient and cushioned fashion.

The mower attachment in the embodiment illustrated incorporates features lending particular utility and efficiency for its described purpose and application. This structure includes a mower blade housing or deck 100. Attached to project vertically of its upper surface are longitudinally oriented, spaced, parallel support plates 101 and 102. These plates are arranged to extend in a sense longitudinally of the platform 10 and include base flange portions fixed to the deck. In connection with each support plate is a scissors-type suspension device including an arm 103 to its inner side and a parallel arm 104 disposing to its outer side. The forward end of the arm 104 is pivotally attached by a suitable device 105 to the upper forward end portion of the adjacent plate 101 or 102, as the case may be. Arm 104 is a plate type bar so formed that, as it extends rearwardly, it is first upwardly inclined to a point 106 directly over a notch 107 in the top edge of the adjacent deck support plate. From the point 106 it inclines downwardly and rearwardly, first at a minimal slope over the underlying blade housing and then in a curve to terminate in a vertically and downwardly directed leg portion 108 depending to the rear of the blade housing.

On the other hand, the inner arm 103 has its forward extremity projected forwardly of the housing 100 and the related arm 104 to pivotally connect to the aforementioned tab 76 by means of a suitable pivot device projected through an aperture therein and the aperture 77 in the tab. Thus, the arms 103 are respectively connected to either the right hand or left hand hinge unit, the latter of which provide the front suspension devices for the mobile vehicle above described.

In extending rearwardly from the tab 76, each arm 103 has a straight run and then an upper inclination to a point 148 which disposes in lateral alignment with the point 106 on the associated outer arm 104. At the corresponding points 106 and 148 the adjacent arms of each scissors assembly have aligned apertures through which extends an interconnecting pivot medium 109. The rearmost end of each arm 103 is downwardly inclined and pivotally connected to the rear upper core portion of the associated support plate 101 or 102, as the case may be.

Projected through aligned apertures in the dependent extremities of the portions 108 of the transversely spaced arms 104 is a relatively fixed rod 110. The rod 110 mounts relatively rotatable roller elements 111. The latter are adapted to bear on ground surface to the rear of the blade housing 100 while the arms 103 project above and forwardly of the deck to pivotally connect to the independent hinge connectors for the front wheels 66 which support the platform 10.

Immediately forward of portions 108 the arms 104 are further bridged by a shaft 112 which projects through apertures therein and is so contained as to dispose in bearing relation thereto. Viewing the drawings, it may be seen that the outer side of the right hard arm 104 has fixed thereto a fan-shaped plate 113 having at the apex thereof an opening accommodating the free projection therethrough of the shaft 112. At the outermost side of the plate 113 the projected extremity of the shaft 112 nests in a channel provided in the lower end of a control arm 115. The arm 115 and the shaft 112 are pivotally hinged by suitable means incorporating a biasing device which normally positions the arm 115 to project upwardly adjacent and generally parallel to the fan-shaped plate 113. The upper expanded portion of the plate 113 is provided with a series of circumferentially spaced radial slots 116 while on its adjacent face the arm 115 has a projected lug 117 adapted, when aligned, to engage in any one of the slots 116. The hinge means of arm 115, which may be of any conventional nature, accommodates, as required, a lateral pivoting of the control arm from the plate 113 to permit the movement of the arm to dispose lug 117 in line with a particular slot. Of course, in the process, the shaft 112 is conjointly rotated.

Referring now to the drawings, it may there be seen that the deck or blade housing 100 may be suspended in an elevated spaced relation to a ground surface between longitudinally spaced support points. The latter are defined by the rollers 111 to the rear of the deck in the one instance and the tabs 76 forwardly thereof in the second instance.

The above described scissors-like suspension devices constituted by the pivotally related arms 103 and 104 arranged above and spaced transversely of the desk structure enable a simple but positive positioning of the mower deck and the blades attached thereto at any desired elevation, under control of the arm 115. To enable this the shaft 112, immediately inward of each arm 104, has fixed thereto a short lever arm 118. Each arm 118 has an offset projected extremity which pivotally connects to one end of a link bar 119. In turn each bar 119 is pivotally connected at its remote extremity to the rear lower end portion of the adjacent support plate 101 or 102, as the case may be. Thus, on rotation of the shaft 112, dependent on the direction, the respective linkages 118 and 119 to either side of the deck are moved to either lengthen or shorten the distance between the shaft 112 and the deck. Thus, if it is desired to adjust the height of the deck, and correspondingly of the mower blades, one need only pivot the arm 115 slightly outward from the plate 113 to release the lug 117 from the particular slot 116 in which it is then positioned. The arm 115 may then be moved forwardly or rearwardly to pivot the shaft 112 until the lug 117 is aligned with the desired slot 116 and then released to enter that slot. This procedure enables the relative adjustment of the height of the deck or housing 100 referenced to ground surface.

Accordingly, due to the scissors interconnection of the related arms 103 and 104 intermediate their lengths, the pivotal interconnection of ends thereof with opposite ends of the support plates 101 and 102, the pivoted suspension of the forward ends of the arms 103 to the hinge assemblies for the front wheels, and the base provided by rollers 111, one may achieve a steady and balanced raising and lowering of the deck as and when needs require. Not only is the lift structure for the independent mower assembly positive in action and result but it provides a simple and sturdy arrangement which may be readily adjusted in the operation of the mobile carriage to which it relates.

Figure 5:
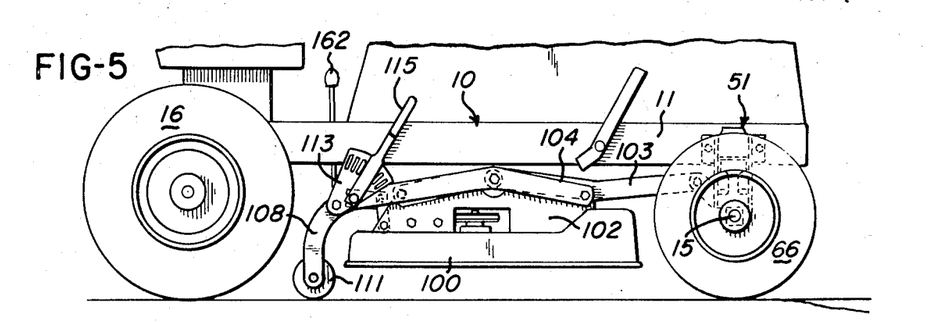
FIGS. 5 to 7 illustrate the adaptation of the front wheels of the mower vehicle and the mower assembly to movements thereof over an irregularly contoured ground surface.
Figure 6:
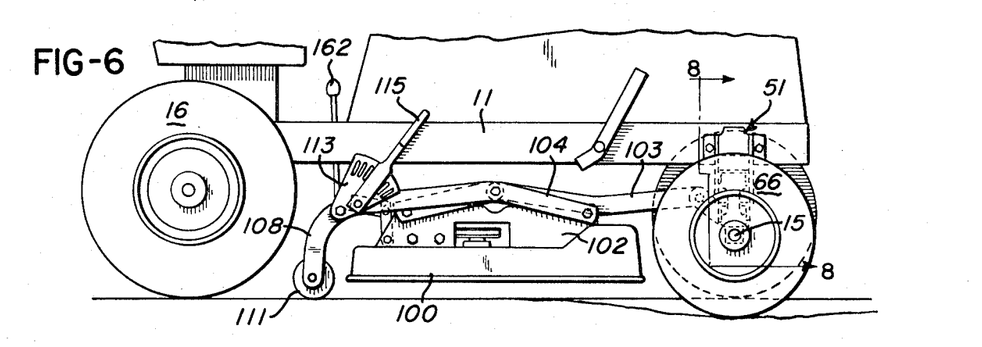
Figure 7:
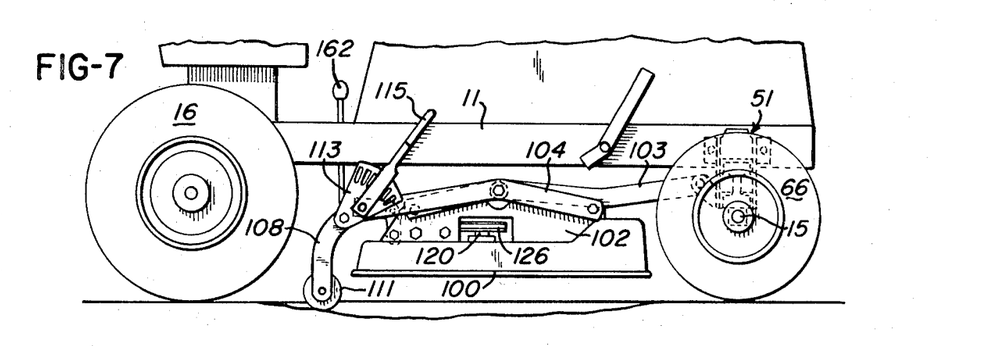

In the particular embodiment illustrated, take particular note of FIGS. 5 through 7 of the drawings, where it will be seen that the mower assembly is so supported to achieve a balanced floating relation referenced to and accommodating the peculiarities of the underlying ground surface. Each arm 103 will move correspondingly with the related hinge unit of the front suspension with which it associates. This will inherently position the housing 100 and the blades therein at the proper orientation to the ground surface. As a result one can avoid the mower blades or housing chewing the ground. Equally important, the direct following of the scissors suspension devices to the front suspension units can, where desirable, bring the blades closer to the desired cutting level in a depressed portion of the terrain over which the mobile vehicle may be moving. It should also be noted, from FIG. 7, that the singular forward suspension of the blade housing enables the rollers 111 to the rear thereof to move down into the depressions and to assist in orienting the blades in an optimal plane to an extent not possible where blades have a fixed planar orientation referenced to a chassis such as platform 10.

For an understanding of the relative free adjusting relation of the mower blades in respect to the platform 10, attention is directed to FIGS. 1 and 4 of the drawings. In the instance illustrated the deck 100 mounts a pair of transversely spaced blades (not shown). The blades are on the lower ends of shafts 120 and 121 fixed for rotation in and projected through to the interior of the blade housing. The portion of the shaft 120 above the deck has fixed thereto a pulley wheel 122. A portion of the shaft 121 above the deck has fixed thereto a similar pulley wheel 123. Centered between and to the rear of the wheels 122 and 123, and co-planar therewith, is a pulley wheel 124. The latter is fixed to a shaft 125 which is rotatably mounted in and projects upwardly of the deck 100. The wheels 122, 123, and 124 are drivingly related by a single continuous belt 126. Intermediate the pulley wheels 124 and 123 the belt 126 is tensioned by an idler pulley 127, in a conventional manner. The shaft 125 projects upwardly of the deck and fixedly mounts for rotation therewith a further pulley wheel 128.

Reference is made to the previous description of the drive shaft 33 as including a drive pulley 34. Reference is further made to the pulley wheels 50 positioned vertically therebelow in connection with the frame 49 on the underside of the platform. The platform 10 has an opening which accommodates the passage therethrough of a continuous belt 129 looped at one end to move freely about the drive pulley 34 and to vertically depend at diametrically opposite sides to have the respective runs thereof pass under the pulleys 50 and 50 and extend to and loop about the pulley 128. It may be seen therefore that on an interconnection of the mower assembly to the hinge units for suspension of the front wheels 66, the drive available at the pulley 34 may be suitably coupled to the mower blades through the medium of looping the end of the belt 129 remote from the pulley 34 about the pulley wheel 128. As will be described, suitable means are provided to apply tension to or release tension from the belt 129 whereby to energize or deenergize the mower blades.

Figure 3:
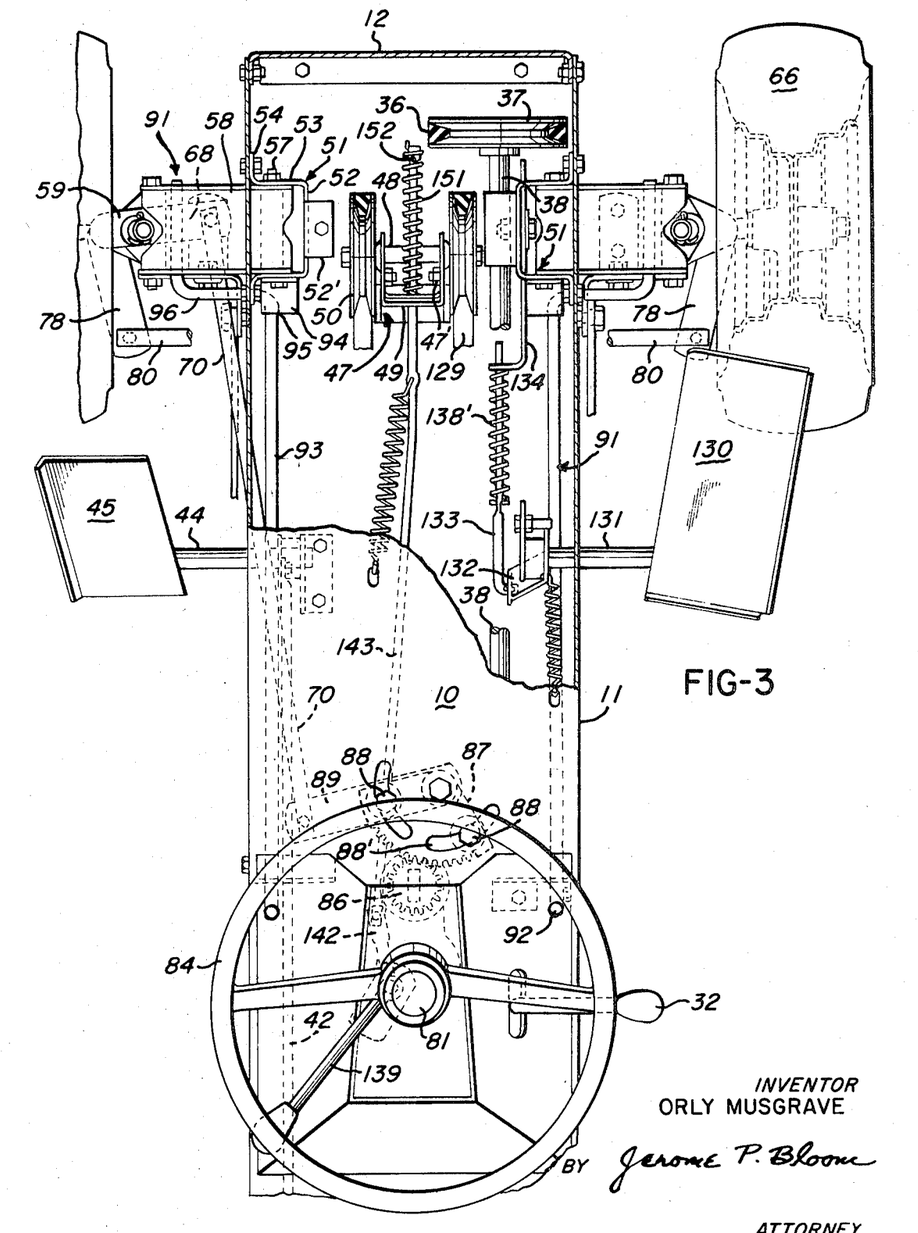
FIG. 3 is a planned view of the platform or frame portion of the vehicle as illustrated in FIGS. 1 and 2 illustrating further control features.

There is further provided in the invention embodiment illustrated a lever 139 an operator portion of which is available in projected relation to a slot in the upper end of the housing 31, to its left hand side. The lower end of this lever is projected through an aperture in the platform 10 and immediately therebelow has a right angled forwardly projected terminal portion 142 including an aperture. This last mentioned aperture receives therethrough the right angled rear most extremity of a rod 143. The rod 143 extends forwardly to project through the bridging portion of the U-shaped bracket 49 which swingably mounts on the frame unit 47. Coiled about the portion of the rod 143 which projects through the bracket 49 is spring 151. The latter is connected at one end to the bridging portion of the bracket 49 and the other end is secured to a pin 152 extending through and transverse to the forward extremity of the rod 143. As shown in FIG. 3 of the drawings, placing the blade clutch operating lever 139 in a rearward position induces a forward movement of the rod 43 against the bias of the spring 151 to pivot the bracket 49 forwardly an amount sufficient to cause the pulleys 50 to be pressured into a tensioned engagement to the belt 129. This draws the remote end of the belt into a taut driving relation to the pulley 128. In the event of a reverse movement of the operating lever 139 the energy stored in the spring 151 assists in a displacement of the bracket 49 to displace pulleys 50 to thereby relieve the tensions effected on the belt 129. Thus, one may readily and easily engage or disengage the mower blades from a driven relation to the available power source. Note that the single flexible power connection by means of the belt 129 is such to accommodate the raising or lowering of the mower blades without materially affecting the drive.

Further, through the use of a dead man's clutch, one may couple or uncouple the drive from the engine E to the transmission unit 21. For this purpose, there is on the right side of the platform 10 a pedal 130. The pedal 130 is fixed to a horizontal pivot shaft 131 which projects through and bears in the adjacent flange 11. Within the flange 11 a generally vertical lever arm 132 is fixed at its approximate center for rotation with the shaft 131. Inserted in an aperture in the lower end of the lever arm 132 is the rear hook-like extremity of a control rod 133. The rod 133 extends forwardly to slidingly project through an aperture in the right angled rear end of a plate-like bar 134. The latter is threaded through aligned slots in the legs 53 of the right hand bracket plate 51. The plate 134 has formed therein a vertically inclined fore and aft slot 135. A pin 136 fixed to project from a bearing housing 137 on the forward end of the transmission shaft 38 projects first through a vertically elongated slot in the bridging portion 52 of plate 51 and through the slot 135. A second pin 136' on the housing 137 projects through an upper vertical slot in the bracket portion 52 and serves as a control medium. Springs 138 and 138' connect to bias the pedal 130, rod 133 and plate 134 to a rearward neutral position disabling the drive from belt 36 to the pulley 37. The one spring 138 connects between lever 132 and platform 10. The other spring 138' wraps about rod 133, anchoring thereto at its rear end and to the right angled rear end portion of the plate 134 at its forward end.

It is to be particularly noted that the transmission shaft 38 incorporates therein a hinge joint 160 accommodating a relative angular adjustment of the fore portion of this main drive shaft. Thus, when the pedal 130 is pressed forwardly, it exerts a bias on the rod 133 and plate 134 to pull them rearwardly. As this occurs, slot 135 moves rearwardly to cam down pin 136 and exert thereby a downward bias on the transmission shaft 38. This produces an engagement of the pulley 37 in a driven relation to the belt 36. When the pedal is released it is biased to its normal position by spring 138, whereupon the rod 133 is urged forwardly to similarly bias, through spring 138', the plate 134, This adjusts the position of the slot 135 to cause pin 136, and correspondingly the bearing housing 137, to move upwardly and relieve the load between pulley 37 and the belt 36. This is sufficient to inhibit a drive therethrough to the transmission unit 21 when the clutch pedal 130 is in a released condition.

There is further provided on the shaft 112 a rod 161 hingedly related to a strap 162. The rod 161 projects upwardly through an opening in the platform 10 for engagement with suitable latching means (not shown). Thus, if one desires to lift the rollers 111 free of the underlying ground surface, one simply pulls up on the rod 161 and latches it in a desired position of elevation referenced to the platform 10.

As is readily apparent, the embodiment above described incorporates many advantageous features. In the illustrated instance there results a uniquely improved riding mower offering comfort to the rider, ease and simplicity of operation, and, above all, presenting minimum problems in maintenance. Further, the platform utilized in the mobile vehicle is economical but rugged in construction and affords an optimal surface area for disposition of component structure and their controls. The hinged interconnection of the front wheels not only affords comfort to the rider but by their ready adaptation to the contours of the underlying terrain minimizes the incidence of damage to and wear of the various components of the assembly here provided. Note should be taken of the simple nature and effective disposition of the incorporated torsion bars which integrate the platform and the front wheel assembly without, however, jeopardizing the adaptability of the front suspension system to achieve the desired end results.

The described cutting assembly per se, as may be readily seen, may be simply and quickly interconnected with the front suspension system and the power available on the vehicle platform. Further, the suspension and mount of the cutting assembly per se is unique in its stability, simplicity and adaptability to the underlying terrain in correspondance with the movements of the hinge units involved in the front suspension system. The fact that the cutting assembly is independent of direct connection with the vehicle platform per se affords a flexibility in its use and operation minimizing damage thereto and wear thereof.

From the above description it will be apparent that there is thus provided a device of the character described possessing the particular features of advantages before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications.

Having thus described my invention, I claim:

1. A mower attachment for a mobile work unit comprising a deck having blade means mounted thereon, means connected to said deck for the releasable interconnection thereof to the mobile unit and to provide a reference frame for raising and lowering said deck, said means including at least one pair of arms in a side by side scissors-like relation pivotally interconnected intermediate their ends, one of said arms being pivotally connected at one end to said deck and at its other end to the mobile unit, the other one of said arms being pivotally connected at one end to said deck and carrying at its other end ground engaging means to rest on ground surface outwardly beyond one end portion of said deck, said ground engaging means being independent of said mobile unit and the connections of said arms to said deck being at respectively opposite ends thereof.

2. A mower attachment according to claim 1, wherein said connected means includes a plurality of pairs of said arms, characterized by shaft means supported between corresponding arms of said plurality of pairs and connections between said shaft means and the deck utilizing rotary motion of said shaft means to vary the height of said deck relative to ground level.

3. A mower attachment according to claim 2, characterized by means for rotating said shaft and for locking it in selected positions of rotation.

4. A mower attachment according to claim 1, wherein said connected means includes a plurality of pairs of said arms similarly arranged and connected.

5. A mower attachment for a mobile work unit comprising a deck having blade means mounted thereon, means connected to said deck for the releasable interconnection thereof to the mobile unit and to provide a reference frame for raising and lowering said deck, said means including pivoted bar means arranged to accommodate the raising and lowering of said deck referenced to the mobile unit and underlying ground surface, there being at least one pair of said bar means, said bar means being pivotally interconnected intermediate their extremities to form a scissors-like attachment device, said bar means having their one ends respectively pivoted at longitudinally spaced portions of said deck, one of said bar means having at its other end means to provide a releasable pivot connection thereof to the mobile unit and the other of said pair of bar means having its other end remote from said releasable pivot connection and connected therewith ground bearing means and means in connection with said deck for the adjustment thereof in a stabilized condition influenced by said scissors-like attachment device.

6. A mower attachment as in claim 4 characterized by two pairs of said pivotally interconnected bar means duplicated at transversely spaced positions referenced to said deck, said other bar means having their remote ends interconnected by means which mount thereon said ground bearing means in the form of rollers.

7. A mower attachment as in claim 5 characterized by a linkage between said other bar means and said deck and means operating on said linkage to effect the raising and lowering of said deck in a balanced condition referenced to the mobile unit and the underlying ground surface.

8. A mower attachment as in claim 5 wherein said other bar means are bridged by a rotatable shaft having in connection therewith a control arm including at least one lug, one of said other bar means including thereon means defining a circularly spaced series of slots for selective engagement by said one lug, lever means fixed to said shaft, and having link means pivotally related thereto and to said deck, the rotation of said shaft providing for relative adjustment of said deck and said bar means.

9. A mower-like device including cutting blade means, a housing therefor exposing at one portion thereof said blade means, a scissors-like attachment assembly connected to said housing providing means disposing at one end to bear on ground surface at one end portion of the housing, independently thereof and movable relative thereto, and having a remote portion pivotally connected to the other end portion of said housing, said attachment assembly further providing other means for anchoring at one end to a mobile frame and pivotally connecting at its other end to said one end portion of said housing, said attachment assembly being arranged to position said housing relative to said mobile frame and with reference to ground surface thereunder to provide for movement therewith of the mobile frame over said ground surface, said scissors-like attachment assembly having further means connected thereto and between said scissors-like attachment and said housing to provide a control to adjust said housing relative the ground surface and the mobile frame.

10. A mower attachment for a mobile work unit comprising a deck having blade means mounted thereon, means connected to said deck for the releasable interconnection thereof to the mobile unit and to provide a reference frame for raising and lowering said deck, said means including pivoted bar means arranged to accommodate the raising and lowering of said deck referenced to the mobile unit and underlying ground surface, there being at least one pair of said bar means and means pivotally interconnecting said bar means to form thereby a scissors-like device for suspending said deck, and a mobile platform including forward and rear supports, said scissors-like suspension device having its fore part connected for movement with the forward support and ground bearing means in connection with its rearmost part arranged to define a reference for support of said deck and its disposition in relation to said platform and the underlying ground surface, and a power source on said platform and quick release means including a flexible connector element for selectively coupling said power source to drive the blade means on said deck, said forward support having hinge means providing a connection thereof to said platform, said hinge means providing for a relative vertical adjustment of the front support and having in connection therewith the fore part of said scissors-like suspension device.

11. A mower attachment for a mobile work unit comprising a deck having blade means mounted thereon, means connected to said deck for the releasable interconnection thereof to the mobile unit and to provide a reference frame for raising and lowering said deck, said means including pivoted bar means arranged to accommodate the raising and lowering of said deck referenced to the mobile unit and underlying ground surface, there being at least one pair of said bar means and means pivotally interconnecting said bar means to form thereby a scissors-like device for suspending said deck, and a mobile platform including forward and rear supports, said scissors-like suspension device having its fore part connected for movement with the forward support and ground bearing means in connection with its rearmost part arranged to define a reference for support of said deck and its disposition in relation to said platform and the underlying ground surface, said forward and rear supports being constituted by wheels rendering said platform mobile, a pair of said wheels having connections providing for their independent vertical adjustment referenced to said platform in movement over a ground surface, and said scissors-like suspension device being constituted by spaced pairs of said pivotally related bar means, one of each pair of said bar means being interconnected with said ground bearing means and said deck and the other of each pair of said bar means being pivotally connected to said deck for movement with one of the said independently adjustable wheels.

12. A mower attachment for a mobile work unit comprising a deck having blade means mounted thereon, means connected to said deck for the releasable interconnection thereof to the mobile unit and to provide a reference frame for raising and lowering said deck, said means including pivoted bar means arranged to accommodate the raising and lowering of said deck referenced to the mobile unit and underlying ground surface, said mobile unit including a platform, wheels supporting the front and rear ends of said platform, the front wheels having a hinged connection with said platform, said hinged connection embodying means for controlling the limits of the vertical travel of said front wheels and providing means for the releasable connection of said deck to said mobile unit whereby said attachment will move with said platform and the blade means thereof will adjust in reference to the platform in correspondence with the adjustment of said hinged connection.

13. An attachment as in claim 12 including a power source on said platform, transmission means for delivery of power to at least a portion of said wheels and releasable means for selectively coupling said power source to drive said blade means on said deck.

14. An attachment as in claim 13 characterized by longitudinally extended torsion bars disposed along respectively opposite sides of said platform, one end of which is projected up to interconnect with said platform and the other end of which is bent and provides a portion projected through a portion of the hinged connection for the front wheel most adjacent thereto.

15. A mower attachment for a mobile work unit comprising a deck having blade means mounted thereon, means connected to said deck for the releasable interconnection thereof to the mobile unit and to provide a reference frame for raising and lowering said deck, said means including pivoted bar means arranged to accommodate the raising and lowering of said deck referenced to the mobile unit und underlying ground surface, said mobile unit including an overlying mobile platform having rear driven wheels and independently hinged front wheels and torsion bars connected at one end to said platform and at the other end to said independently hinged wheels to maintain a predetermined relation between said platform and said front wheels and said pivoted bar means having a connection with each of said front wheels for movement therewith and relative thereto whereby to enable said deck and blade means to adjust to underlying terrain independently of said platform.

References Cited
UNITED STATES PATENTS

| | | | |
|---|---|---|---|
| 2,711,624 | 6/1955 | Crump | 56—25.4 |
| 2,879,859 | 3/1959 | Swisher | 56—25.4X |
| 2,928,223 | 3/1960 | Danuser | 56—25.4 |
| 3,077,065 | 2/1963 | Samways et al. | 56—25.4 |
| 3,199,276 | 8/1965 | Hahn | 56—25.4 |
| 3,245,209 | 4/1966 | Marek | 56—25.4 |
| 3,283,486 | 11/1966 | Marek et al. | 56—25.4 |

LOUIS G. MANCENE, Primary Examiner

J. A. OLIFF, Assistant Examiner